US007802513B2

(12) United States Patent
Lendel et al.

(10) Patent No.: US 7,802,513 B2
(45) Date of Patent: Sep. 28, 2010

(54) BRAKE ACTUATING DEVICE

(75) Inventors: Stepan Lendel, Jincin (CZ); Horst Bornemann, Hofheim/Ts (DE); Rainer Schrimpf, Frankfurt/M (DE); Jörg Kleisinger, Seligenstadt (DE)

(73) Assignee: Continental Teves AG & Co. oHG (DE)

( * ) Notice: Subject to any disclaimer, the term of this patent is extended or adjusted under 35 U.S.C. 154(b) by 638 days.

(21) Appl. No.: 11/804,228

(22) Filed: May 17, 2007

(65) Prior Publication Data

US 2007/0295202 A1 Dec. 27, 2007

(30) Foreign Application Priority Data

May 19, 2006 (DE) ....................... 10 2006 023 867
Aug. 16, 2006 (DE) ....................... 10 2006 038 168

(51) Int. Cl.
*F01B 29/00* (2006.01)

(52) U.S. Cl. ........................................................ 92/128

(58) Field of Classification Search .................. 92/128; 91/376 R; 403/365, 372
See application file for complete search history.

(56) References Cited

U.S. PATENT DOCUMENTS

| | | | | |
|---|---|---|---|---|
| 4,784,046 | A | | 11/1988 | Gautier |
| 4,790,235 | A | | 12/1988 | Gautier et al. |
| 5,619,900 | A | * | 4/1997 | Kullmann et al. ............. 92/128 |
| 6,357,953 | B1 | * | 3/2002 | Ballantyne .................. 403/365 |

FOREIGN PATENT DOCUMENTS

| | | | |
|---|---|---|---|
| DE | 3804850 | A1 | 8/1989 |
| DE | 42 31 787 | A1 | 3/1994 |
| DE | 198 05 845 | A1 | 8/1999 |

* cited by examiner

*Primary Examiner*—Michael Leslie
(74) *Attorney, Agent, or Firm*—RatnerPrestia

(57) ABSTRACT

A brake actuating device of a motor vehicle brake system includes a master cylinder and a brake booster with a booster housing, with an attaching element for attaching the brake actuating device to a wall on the vehicle projecting through an opening from the booster housing. To improve the assembly, a means for the provisional attachment of the brake actuating device to the wall on the vehicle is provided, which cooperates in operative and/or positive engagement with the vehicle wall or a component that is arranged at the vehicle wall in an attached fashion.

12 Claims, 6 Drawing Sheets

3
29
7
6
30
31
4

8
6
4
9
7
11
10
12
21
19
20
13
14
15

6
4
18
17
16

6
4
33
23
22

6
4
27
28
26

6
4
18
17
16
32
10

6
4
23
25
22
24
10

6
4
27
28
26
10

BRAKE ACTUATING DEVICE

RELATED APPLICATIONS

This application claims priority to German Application No. 10 2006 038 168.8 filed Aug. 16, 2006 and German Application No. 10 2006 023 867.2 filed May 19, 2006, the contents of such patents being incorporated by reference herein.

FIELD OF THE INVENTION

The present invention relates to a brake actuating device of a motor vehicle brake system comprising a master cylinder and a brake booster with a booster housing, with an attaching element for attaching the brake actuating device to a wall on the vehicle projecting through an opening from the booster housing.

BACKGROUND

DE 198 05 845 A1 discloses a brake actuating device of this type, for example. Mounting the brake actuating device on the wall on the vehicle is partly very complicated because the brake actuating device is mounted from the engine compartment of the vehicle to the wall on the vehicle and must be held until it is finally attached on an inside surface of the vehicle by means of appropriate attaching elements. Several persons are generally needed for this purpose.

SUMMARY OF THE INVENTION

In view of the above, an object of the invention is to provide a brake actuating device requiring less mounting effort.

According to the invention, this object is achieved in that a means for the provisional attachment of the brake actuating device to the wall on the vehicle is provided, which cooperates in operative and/or positive engagement with the vehicle wall or a component that is arranged on the vehicle wall in an attached fashion. This allows retaining the brake actuating device provisionally without further assistance on the vehicle wall or the component attached thereto, whereby the mounting effort can be reduced considerably. The wall on the vehicle is also referred to as splashboard, and the component attached thereto may be a so-called pedal box, for example.

BRIEF DESCRIPTION OF THE DRAWINGS

Further features, advantages and possible applications of the invention can be seen in the sub claims and the subsequent description of several embodiments making reference to the accompanying drawings.

In the drawings.

DETAILED DESCRIPTION OF THE PREFERRED EMBODIMENT

Figure 1:
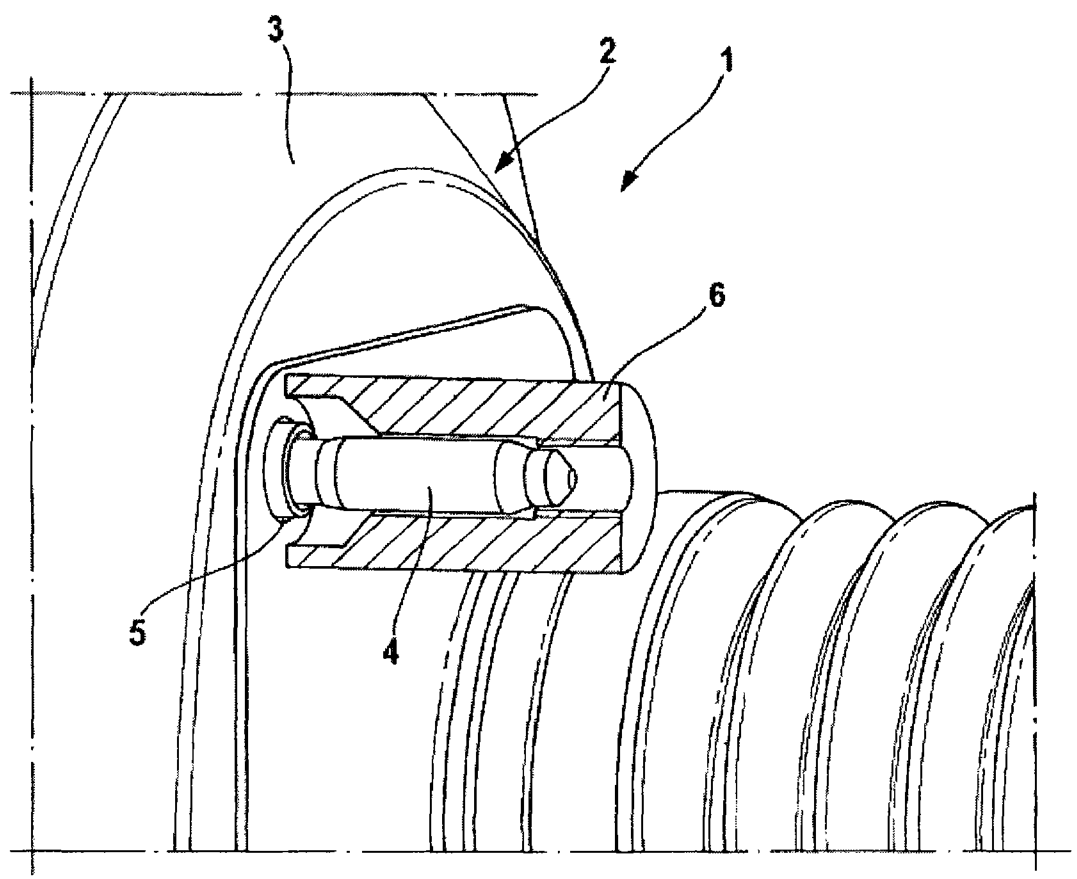
FIG. 1 is a cross-sectional view of a prior art brake actuating device with an attaching element after the installation into the pedal box.

FIG. 1 shows a cross-sectional view of a prior-art brake actuating device of a motor vehicle brake system, which comprises a master cylinder (not shown) and a pneumatic brake booster 1.

The pneumatic brake booster 1 shown in FIG. 1 can be configured as a single-type or tandem-type brake booster and comprises a booster housing 2 including a first housing half shell (not shown) facing the master cylinder and a second housing half shell 3, the half shells being press-fitted preferably by way of shaping provisions. After the assembly and attachment of the brake actuating device, the second housing half shell 3 typically bears against a vehicle wall, i.e. against the so-called splashboard 29 illustrated in FIG. 2*c*.

The design and function of a brake booster 1 of this type and of a master cylinder are well known in the art so that a related description is omitted.

As can be seen in FIG. 1, at least one attaching element 4 for attaching the brake actuating device to the splashboard 29 or a component 6 attached thereto projects through an opening 5 out of the second housing half shell 3. The attaching element 4 can be configured as a screw or a threaded bolt as a part of a reinforcing element, which extends through an interior of the booster housing 2. A reinforcing element of this type ensures that, even with a small wall thickness of the booster housing 2, the two housing halves remain at a defined distance from each other in spite of great pressure forces, which act on the booster housing 2 due to the difference in pressure between the residual pressure in the interior of the brake booster 1 and the outside atmospheric pressure.

Mounting the prior art brake actuating device at the splashboard 29 is complicated because the brake actuating device is mounted from the engine compartment of the vehicle to the splashboard 29 and must be held until it is finally attached on the vehicle inside surface by means of appropriate attaching elements. Several persons are even needed for this purpose under certain circumstances.

Figures 2A, 2B, 3A, 3B, 4A, 4B:
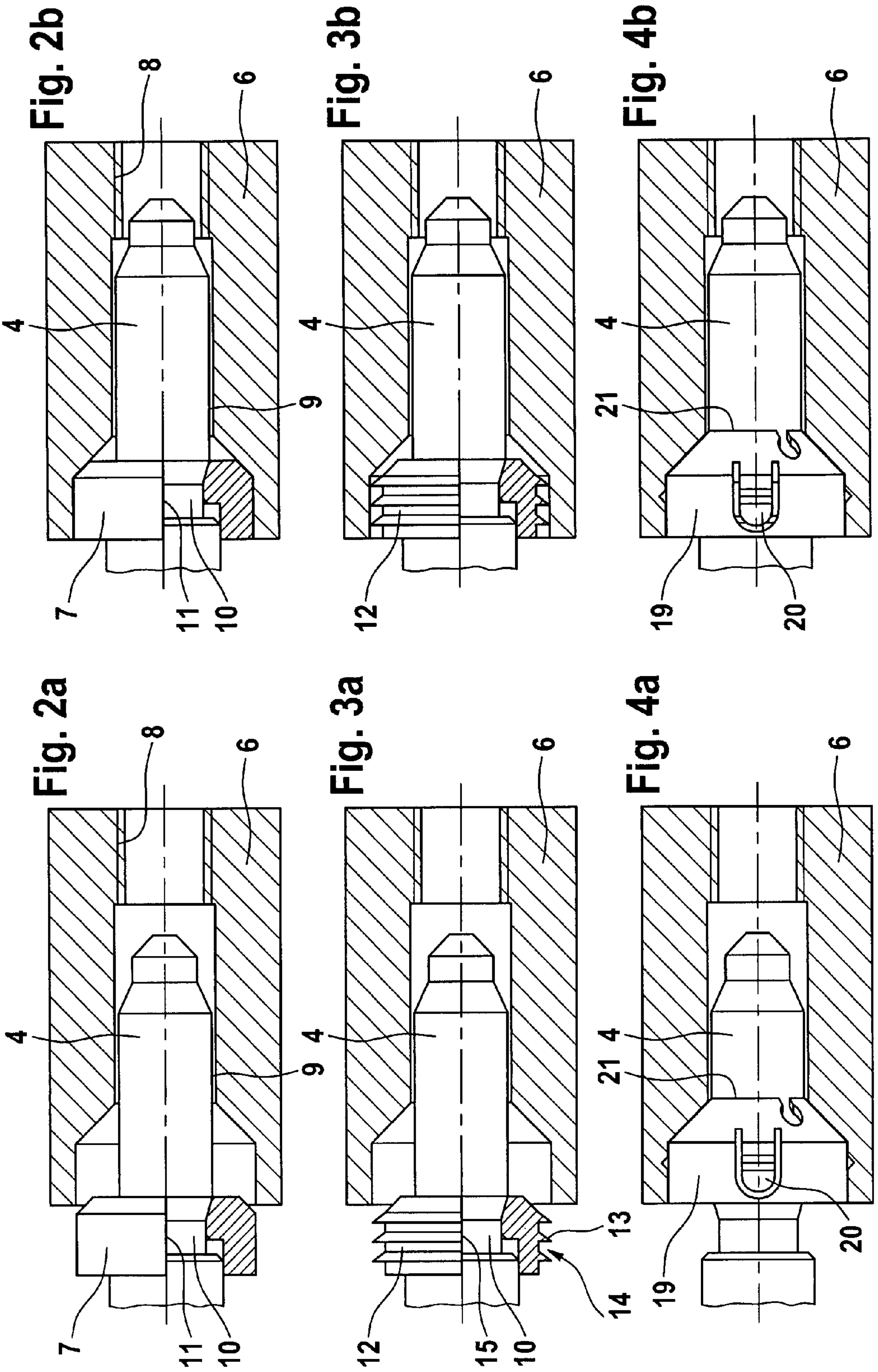
FIG. 2*a* is a cross-sectional view of a first embodiment of a brake actuating device of the invention including a plug that is arranged on the attaching element prior to the fixation to the pedal box.
FIG. 2*b* is the cross-sectional view of the first embodiment according to FIG. 2*a* after the fixation to the pedal box and prior to the final attachment by means of a tool.
FIG. 3*a* is a cross-sectional view of a second embodiment of a brake actuating device of the invention including a plug with an external toothing that is arranged on the attaching element prior to the fixation to the pedal box.
FIG. 3*b* is the cross-sectional view of the second embodiment according to FIG. 3*a* after the fixation to the pedal box and prior to the final attachment by means of a tool.
FIG. 4*a* is a cross-sectional view of a third embodiment of a brake actuating device of the invention including a sleeve that is integrated into the pedal box prior to the fixation to the pedal box.
FIG. 4*b* is the cross-sectional view of the third embodiment according to FIG. 4*a* after the fixation to the pedal box and prior to the final attachment by means of a tool.

FIGS. 2*a* and 2*b* display a cross-section of a first embodiment of a brake actuating device of the invention including a substantially annular plug 7 made of rubber or plastics as a means for the provisional attachment of the brake actuating device, which is arranged on the attaching element 4. As can be seen, FIG. 2*a* shows a condition prior to the fixation to the component 6, and the component 6 can be a so-called pedal box or a sleeve fixed therein. FIG. 2*b* shows the cross-section after the fixation of the brake actuating device with the component 6 and prior to the final attachment by means of a tool. The embodiment differs from the brake actuating device according to FIG. 1 in the design of the attaching element 4 and the component 6 so that reference to the remaining components of the brake actuating device of the invention need not be repeated.

For the final attachment, the attaching element 4 can be designed in such a way that it projects from the component 6 and that a nut is screwed onto the attaching element 4 for the final attachment. However, as is shown, the component 6 can also include an internal thread 8, into which the attaching element 4 can be screwed with a mating external thread 9 using a tool.

Further, it is obvious that the plug 7 is arranged in a circumferential groove 10 of the attaching element 4 and that the plug 7 includes a slit 11 for installation on the attaching element 4.

Figure 2C:
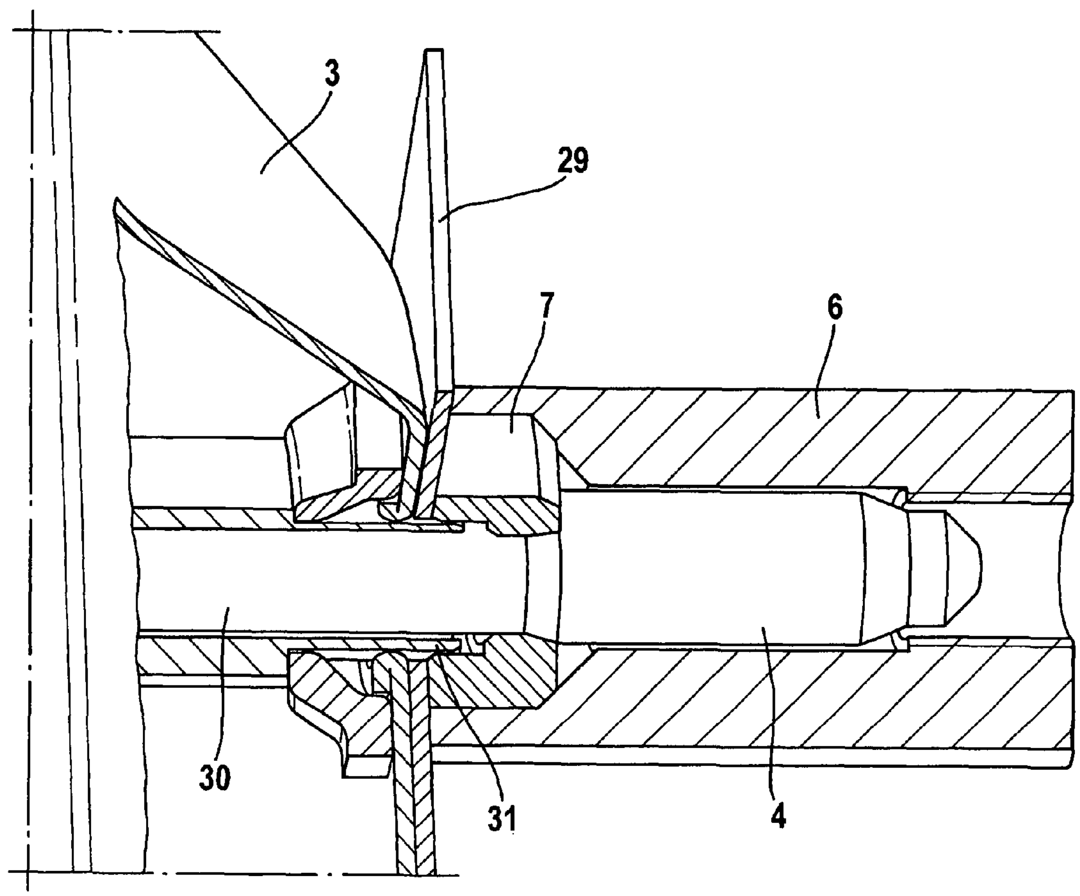
FIG. 2*c* is an enlarged cross-sectional view of the brake actuating device of the invention according to FIGS. 2*a* and 2*b;*

FIG. 2*c* shows an enlarged cross-section of the first embodiment. As can be seen, a thin-walled tube 31 is provided in addition to the attaching element 4, which is configured as a threaded bolt 30 penetrating the interior of the booster housing 2, with the tube 31 and the threaded bolt 30 forming the reinforcing element.

After the assembly of the brake actuating device at the splashboard 29 and at the component 6, plug 7 allows a provisional attachment because the attaching element 4 gets jammed thereby in operative engagement in the component 6. Thus, the brake actuating device is held by itself prior to the final attachment, what renders it possible to considerably reduce the mounting effort.

As becomes obvious from the following embodiments, the plug 7 of the first component can be replaced by all feasible components, which permit an operative and/or a positive engagement with the splashboard 29 or the component 6 attached thereto.

The following embodiments differ from the first embodiment basically by the design of the means for the provisional attachment only and, accordingly, by the design of the component 6.

Thus, FIGS. 3*a* and 3*b* show a second embodiment of a brake actuating device of the invention. The means for the provisional attachment is a plug 12 made of plastics or rubber, including an external toothing with several teeth 13 on an outside surface 14. Plug 12 likewise has a substantially annular design and includes a slit 15.

Figure 5B:
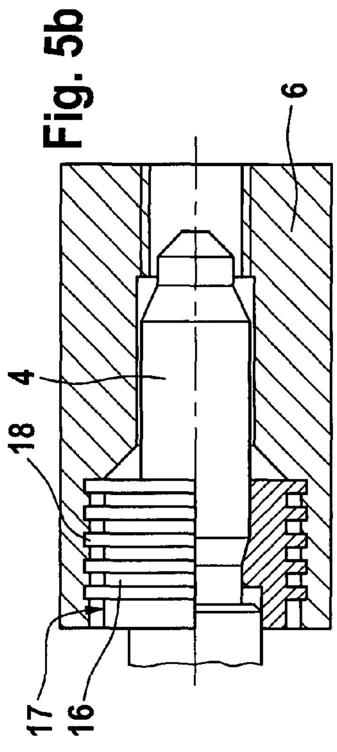
FIG. 5*b* is the cross-sectional view of the fourth embodiment according to FIG. 5*a* after the fixation to the pedal box prior to the final attachment by means of a tool.
Figure 5A:
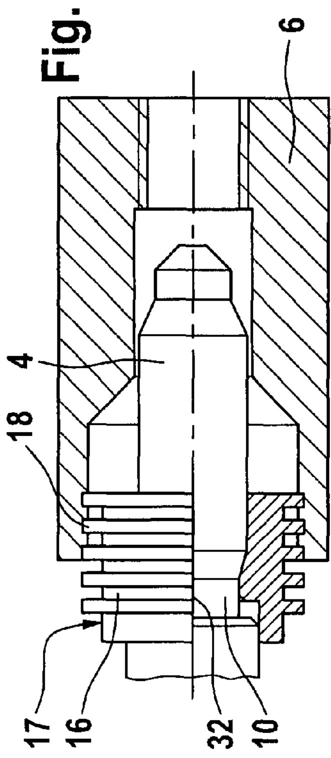
FIG. 5*a* is a cross-sectional view of a fourth embodiment of a brake actuating device of the invention including a plug with ribs that is arranged on the attaching element prior to the fixation to the pedal box.
Figure 5C:
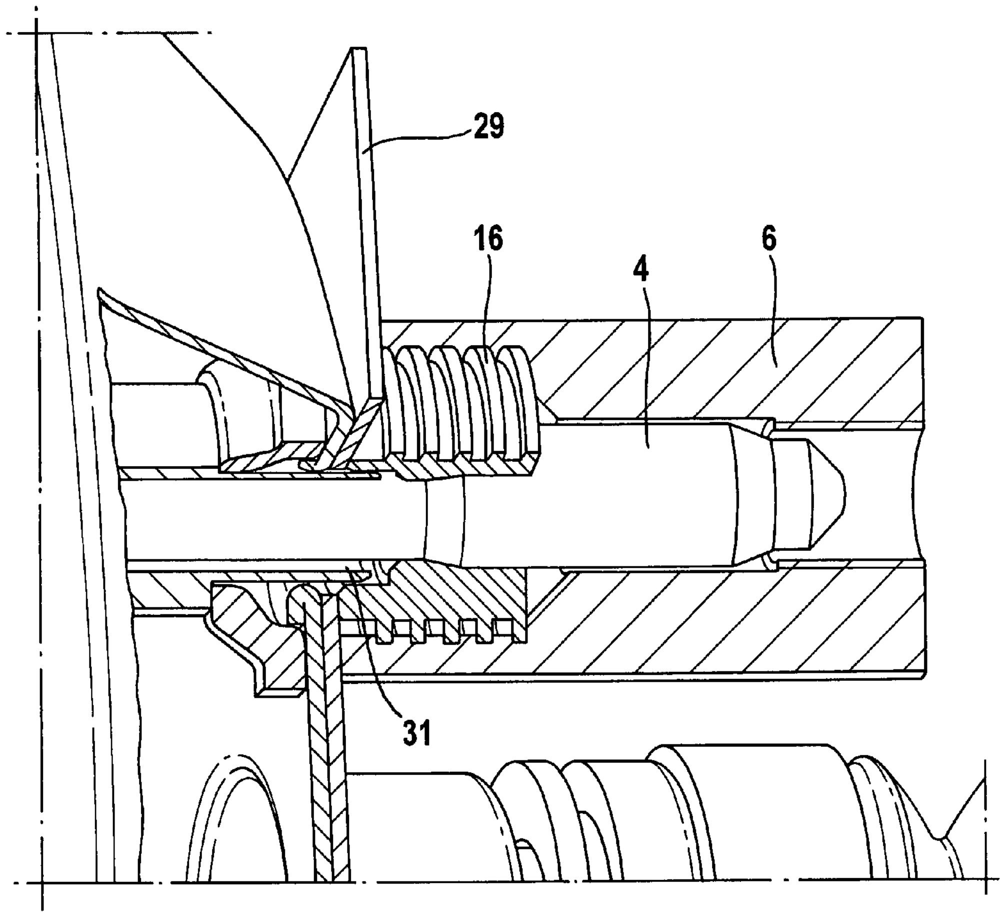
FIG. 5*c* is an enlarged cross-sectional view of the brake actuating device of the invention according to FIGS. 5*a* and 5*b;*

Accordingly, FIGS. 5*a*, 5*b* and 5*c* exhibit a cross-sectional view of a fourth embodiment of a brake actuating device of the invention, with the means being designed as a plug 16 made of plastics or rubber with several ribs 18 on an outside surface 17 and a slit 32.

FIGS. 4*a* and 4*b* show a cross-section of a third embodiment of a brake actuating device of the invention. It includes a sleeve 19 as a means, which is integrated and fastened in the component 6 by means of spreading elements 20. Sleeve 19 is configured such that a reduced diameter 21 on one side of sleeve 19 causes jamming of the attaching element 4 after the assembly.

Figure 6B:
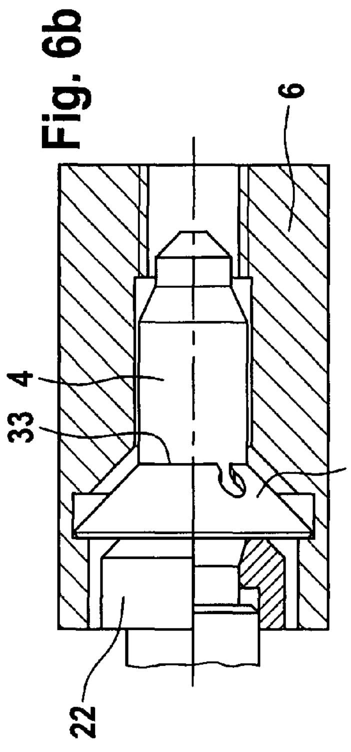
FIG. 6*b* is the cross-sectional view of the fifth embodiment according to FIG. 6*a* after the fixation to the pedal box and prior to the final attachment by means of a tool.
Figure 6A:
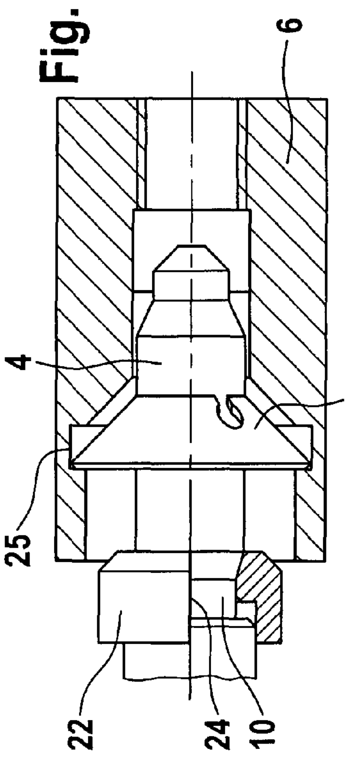
FIG. 6*a* is a cross-sectional view of a fifth embodiment of a brake actuating device of the invention including a plug that is arranged on the attaching element, and a disc, prior to the fixation to the pedal box.

Further, FIGS. 6*a* and 6*b* show a cross-section of a fifth embodiment of a brake actuating device of the invention with a plug 22 made of rubber or plastics, which is arranged on the attaching element 4 and includes a slit 24. A truncated-cone-shaped disc 23 made of plastics or metal is arranged in a recess 25 of the component 6 and assumes the same function as the sleeve 19 described with respect to FIGS. 4*a* and 4*b*, jamming the attaching element 4 by means of a reduced diameter 33. In this case, plug 22 is used to position the attaching element 4 in the component 6.

Figure 7B:
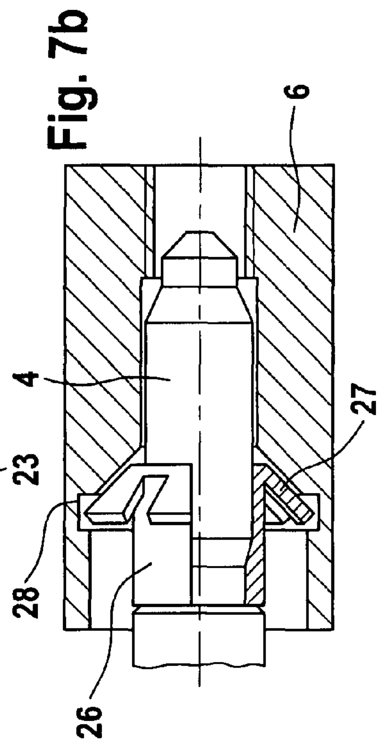
FIG. 7*b* is the cross-sectional view of the sixth embodiment according to FIG. 7*a* after the fixation to the pedal box and prior to the final attachment by means of a tool.
Figure 7A:
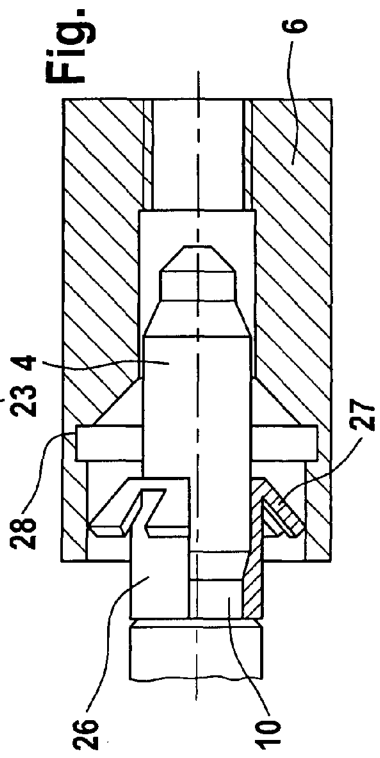
FIG. 7*a* is a cross-sectional view of a sixth embodiment of a brake actuating device of the invention including a clip with spreading elements that is arranged on the attaching element, prior to the fixation to the pedal box.
Figure 7C:
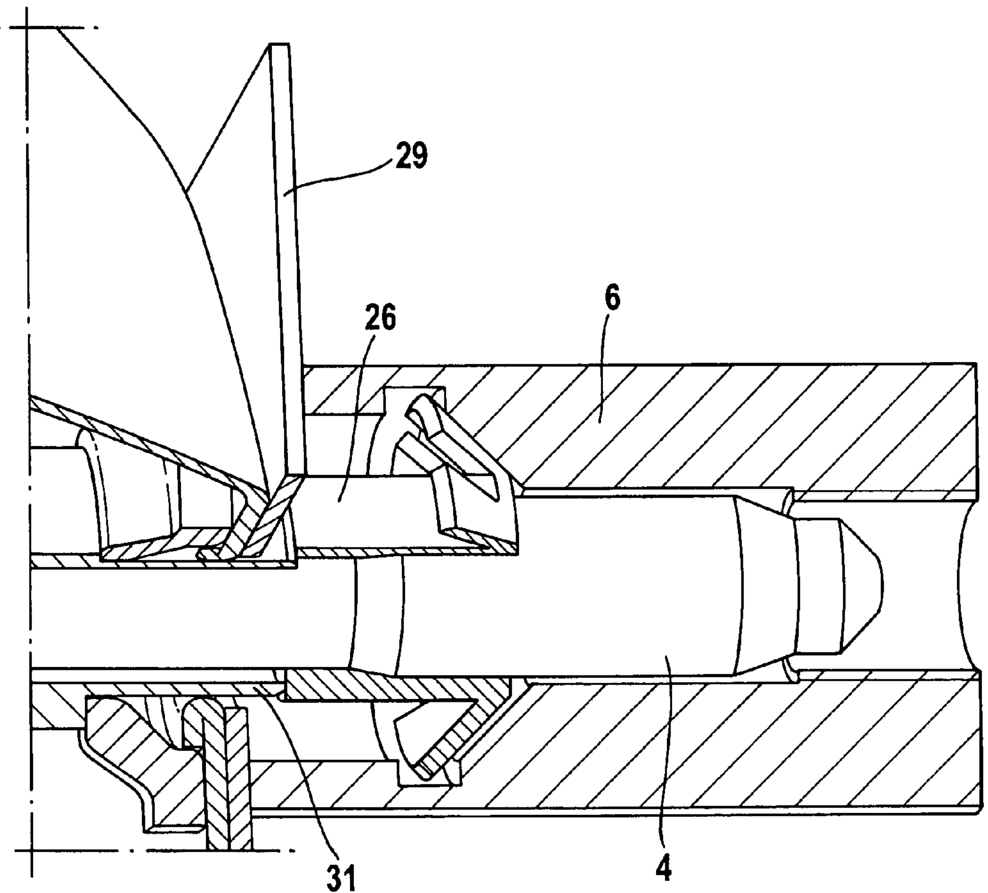
FIG. 7*c* is an enlarged cross-sectional view of the brake actuating device of the invention according to FIGS. 7*a* and 7*b.*

FIGS. 7*a*, 7*b* and 7*c* display in each case a cross-section of a sixth embodiment of a brake actuating device of the invention with a clip 26 made of plastics. As is apparent, the clip 26 is arranged on the attaching element 4 in the groove 10 and is furnished with several spreading elements 27, which can snap into a recess 28 of the component 6 after the assembly.

The invention claimed is:

1. A brake actuating device of a motor vehicle brake system comprising a master cylinder and a brake booster with a booster housing, with an attaching element for attaching the brake actuating device to a wall of the vehicle projecting through an opening from the booster housing, wherein a means for the provisional attachment of the brake actuating device to the wall on the vehicle is provided, which cooperates in operative and/or positive engagement with the vehicle wall or a component that is arranged on the vehicle wall in an attached fashion.

2. The brake actuating device as claimed in claim 1, wherein the means for the provisional attachment is a plug, the said plug being arranged at the attaching element and, after the assembly of the brake actuating device to the wall on the vehicle, cooperates in operative and/or positive engagement with the component.

3. The brake actuating device as claimed in claim 2, wherein the plug is arranged in a groove of the attaching element.

4. The brake actuating device as claimed in claim 2, wherein the plug is made of plastics or rubber.

5. The brake actuating device as claimed in claim 4, wherein the plug has a substantially annular design and includes a slit.

6. The brake actuating device as claimed in claim 5, wherein the plug has ribs or an external toothing with teeth on an outside surface.

7. The brake actuating device as claimed in claim 1, wherein the means for the provisional attachment is a sleeve with at least one spreading element, with the sleeve being adapted to be attached in the component by means of the spreading element, and with the attaching element being fixed in position by means of the sleeve after the assembly of the brake actuating device at the wall on the vehicle.

8. The brake actuating device as claimed in claim 7, wherein the sleeve has a reduced diameter, by which the attaching element can get jammed.

9. The brake actuating device as claimed in claim 1, wherein the means for the provisional attachment is a disc, with the disc being arranged in a recess of the component, and with the attaching element being fixed in position by means of the disc after the assembly of the brake actuating device at the vehicle wall.

10. The brake actuating device as claimed in claim 9, wherein the disc has a reduced diameter, by which the attaching element can get jammed.

11. The brake actuating device as claimed in claim 1, wherein the means for the provisional attachment is a clip with at least one spreading element, with the clip being arranged on the attaching element and, after the assembly of the brake actuating device on the vehicle wall cooperates in positive engagement with the component.

12. A brake actuating device of a motor vehicle brake system comprising a master cylinder and a brake booster with a booster housing, with an attaching element that projects through an opening of the booster housing for attaching the brake actuating device to a wall of the vehicle, wherein a means for the provisional attachment of the brake actuating device to the wall on the vehicle is captivated to the attaching element and is configured to cooperate in operative and/or positive engagement with the vehicle wall or a component that is arranged on the vehicle wall in an attached fashion.

* * * * *